(12) United States Patent
Trent, Jr.

(10) Patent No.: US 11,282,527 B2
(45) Date of Patent: Mar. 22, 2022

(54) SUBAUDIBLE TONES TO VALIDATE AUDIO SIGNALS

(71) Applicant: Synaptics Incorporated, San Jose, CA (US)

(72) Inventor: Raymond Alexander Trent, Jr., San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 63 days.

(21) Appl. No.: 16/805,437

(22) Filed: Feb. 28, 2020

(65) Prior Publication Data

US 2021/0272560 A1 Sep. 2, 2021

(51) Int. Cl.
*G10L 17/22* (2013.01)
*G10L 15/20* (2006.01)
*G10L 21/0232* (2013.01)
*G10L 17/24* (2013.01)
G10L 21/0216 (2013.01)

(52) U.S. Cl.
CPC .............. *G10L 17/22* (2013.01); *G10L 15/20* (2013.01); *G10L 17/24* (2013.01); *G10L 21/0232* (2013.01); *G10L 2021/02163* (2013.01)

(58) Field of Classification Search
CPC ...................................................... G10L 15/20
See application file for complete search history.

(56) References Cited

U.S. PATENT DOCUMENTS

| 9,319,096 | B1 * | 4/2016 | Rifkin | H04B 1/70752 |
| 10,063,542 | B1 * | 8/2018 | Kao | G10L 17/24 |
| 2009/0180659 | A1 * | 7/2009 | Sander | H04R 3/00 381/384 |
| 2013/0217334 | A1 * | 8/2013 | Yu | H04W 76/10 455/41.2 |
| 2014/0269212 | A1 * | 9/2014 | Xiang | G01S 5/30 367/197 |
| 2016/0104483 | A1 * | 4/2016 | Foerster | G10L 15/02 704/275 |
| 2017/0287495 | A1 * | 10/2017 | Tada | G10L 19/167 |
| 2018/0191908 | A1 * | 7/2018 | Mehta | H04N 7/152 |
| 2019/0103115 | A1 * | 4/2019 | Lesso | G10L 17/02 |
| 2019/0122691 | A1 * | 4/2019 | Roy | H04B 1/04 |
| 2019/0220581 | A1 * | 7/2019 | Li | G06F 21/32 |
| 2019/0267009 | A1 * | 8/2019 | Zwart | G06F 21/566 |
| 2019/0311722 | A1 * | 10/2019 | Caldwell | G10L 17/02 |
| 2020/0064791 | A1 * | 2/2020 | Galvez | G05B 15/02 |
| 2020/0162805 | A1 * | 5/2020 | Lesso | H04R 1/08 |

* cited by examiner

*Primary Examiner* — Shaun Roberts
(74) *Attorney, Agent, or Firm* — Paradice & Li LLP

(57) ABSTRACT

A method and processing system for validating an audio signal is disclosed. A valid audio signal is an audio signal that has been determined to originate from a microphone and has not been provided by a digital audio source. In some implementations, one or more speakers may generate a sequence of one or more subaudible tones. Simultaneously, a microphone near the one or more speakers captures an audio signal. If the captured audio signal includes the one or more subaudible tones from the speakers, then the audio signal is a validated.

16 Claims, 7 Drawing Sheets

SUBAUDIBLE TONES TO VALIDATE AUDIO SIGNALS

TECHNICAL FIELD

This disclosure relates generally to voice recognition systems, and more specifically to systems and methods for using subaudible tones to validate audio signals.

BACKGROUND OF RELATED ART

Many computing devices use voice commands as a means to enable users to control the devices and provide input without using traditional input methods such as a mouse and keyboard. Some computing devices may use a variety of voice recognition techniques to ensure that only authorized users are permitted to control the respective computing device and to prevent unintended or spurious actions.

Although the voice recognition techniques may verify a user's voice, they may not be able to detect if hardware has been compromised and a digital recording has been used to circumvent voice recognition security. Therefore, there exists a need to verify that the audio signals used for voice recognition are actual (live) audio signals from a microphone and not signals received through compromised or modified hardware.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method. The method may include outputting, by a first speaker, a first sequence of subaudible tones and outputting, by a second speaker, a second sequence of subaudible tones, wherein the first sequence of subaudible tones is different from the second sequence of subaudible tones. The method may further include receiving, from a microphone, an audio signal while concurrently outputting the first and second sequences of subaudible tones, and selectively validating the audio signal based on whether the audio signal includes the first and second sequence of subaudible tones.

Another innovative aspect of the subject matter described in this disclosure can be implemented as a processing system. The processing system may include one or more speakers, at least one microphone, one or more processors, and a memory storing instructions that, when executed by the one or more processors, cause the processing system to output, by a first speaker, a first sequence of subaudible tones and output, by a second speaker, a second sequence of subaudible tones, where the first sequence of subaudible tones is different from the second sequence of subaudible tones. Execution of the instructions may further cause the processing system to receive an audio signal from the microphone while concurrently outputting the first and second sequences of subaudible tones, and selectively validate the audio signal based on whether the audio signal includes the first and second sequences of subaudible tones.

Another innovative aspect of the subject matter described in this disclosure can be implemented as another method. The method may include outputting, by a first speaker, one or more subaudible tones, receiving, from a microphone, an audio signal while concurrently outputting the one or more subaudible tones, selectively validating the audio signal based at least in part on whether the audio signal includes the one or more subaudible tones, and authenticating a user's identity based at least in part on the validated audio signal. The method may further include matching a voice in the audio signal to a previously captured reference voice pattern.

BRIEF DESCRIPTION OF THE DRAWINGS

The present embodiments are illustrated by way of example and are not intended to be limited by the figures of the accompanying drawings.

DETAILED DESCRIPTION

Figure 1:
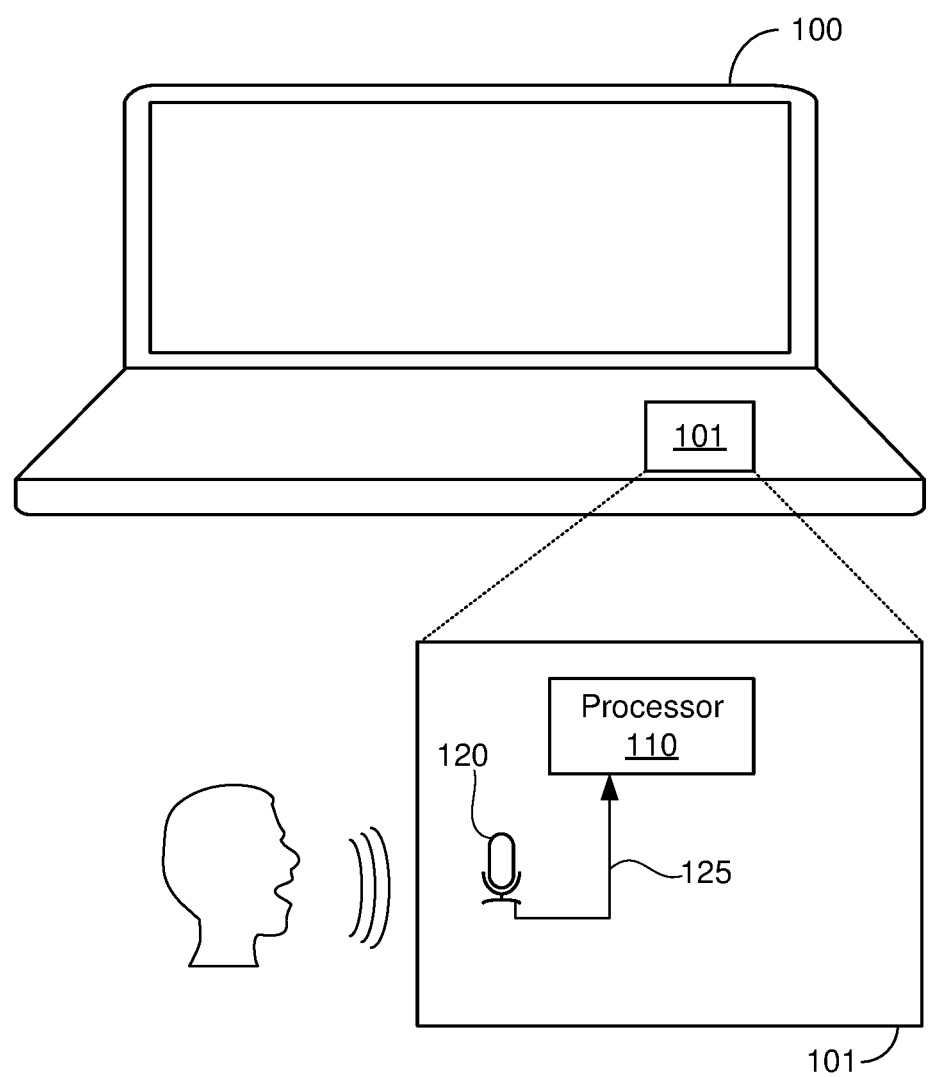
FIG. 1 shows an example computing device.

In the following description, numerous specific details are set forth such as examples of specific components, circuits, and processes to provide a thorough understanding of the present disclosure. The term "coupled" as used herein means connected directly to or connected through one or more intervening components or circuits. The terms "processing system" and "processing device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory, and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits, and instructions described in connection with the implementations disclosed herein may be executed by one or more processors. The term "processor," as used herein may refer to any general purpose processor, conventional processor, controller, microcontroller, and/or state machine capable of executing scripts or instructions of one or more software programs stored in memory. The term "voltage source," as used herein may refer to a direct-current (DC) voltage source, an alternating-current (AC) voltage source, or any other means of creating an electrical potential (such as ground).

Various implementations relate generally validating an audio signal to indicate that the source of the audio signal has been verified. Some implementations more specifically relate to a system and method to validate an audio signal from a microphone. In some implementations, one or more speakers are configured to generate one or more subaudible tones. A subaudible tone refers to any tone with a frequency and/or sound level that is outside a range of typical human hearing. While the one or more speakers are generating the one or more subaudible tones, a processor receives an audio signal from a microphone. If the audio signal includes the same or substantially similar subaudible tones, then the audio signal is a valid audio signal. If the audio signal does not include the same subaudible tones, then the audio signal is not a valid audio signal.

Particular implementations of the subject matter described in this disclosure can be implemented to prevent spoofing of audio signals. In some implementations, the described techniques can be used to verify that the audio signal is provided by a microphone near the speakers and not from a digital audio source. A valid audio signal may be trusted for use in other tasks such as voice recognition.

FIG. 1 shows an example computing device 100. The computing device 100 may include a voice recognition system 101 which may include a processor 110 and a microphone 120. Although shown as associated with the voice recognition system 101, the processor 110 and the microphone 120 may be shared with other components, systems, or devices associated with the computing device 100. For example, the processor 110 may be shared with other input or output devices or may be a main processor of the computing device 100. Similarly the microphone 120 may be a system microphone installed within the computing device 100 to capture speech for audio recordings, audio and/or video conferencing, and the like.

The voice recognition system 101 may detect a user's voice via the microphone 120 and authenticate the user's identity based on his or her voice. To authenticate the user's identity, the processor 110 may compare the user's voice received by the microphone 120 to a number of reference voice patterns that have been previously captured. If a match is found, then the voice recognition system 101 may signal the computing device 100 that the user's identity has been authenticated.

If the user's identity is authenticated, then the voice recognition system 101 may cause the computing device 100 to become accessible or functional. For example, after the voice recognition system 101 authenticates the user's identity, the voice recognition system 101 may cause the computing device 100 to "unlock" in a manner similar to as if a correct password is provided to a keyboard or a valid (e.g., enrolled) fingerprint is presented to a fingerprint scanner. If the user's identity is not authenticated, then the voice recognition system 101 may cause the computing device 100 to remain or become locked.

As described, the microphone 120 receives audio signals, such as a voice, and converts the sound into an audio signal 125. In some implementations, the microphone 120 may include an analog-to-digital converter (ADC) to convert analog microphone signals to digital microphone signals. Thus, in some implementations, the audio signal 125 may be a digital signal. In some other implementations, the processor 110 may include an ADC to convert an analog microphone signal to a digital microphone signal. In still other implementations, an ADC may be disposed at any feasible location within or near the voice recognition system 101 to convert analog microphone signals to digital microphone signals. The possible implementations of the ADC are not shown in FIG. 1 so as not to obfuscate the drawing. Although the processor 110 may determine whether the voice captured by the microphone 120 matches a voice pattern of a user, the voice recognition system 101 may be vulnerable to a hardware-based attack where a digital recording of the user is used.

Figure 2:
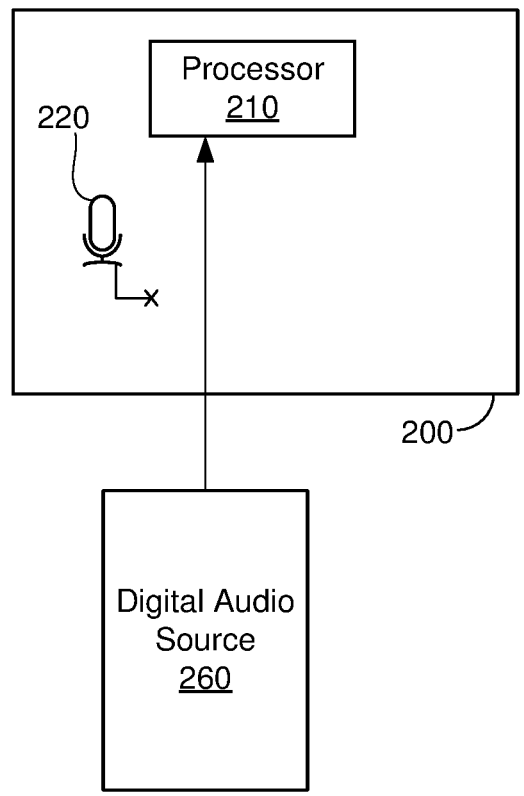
FIG. 2 shows one implementation of a compromised voice recognition system.

FIG. 2 shows one implementation of a compromised voice recognition system 200. The voice recognition system 200 may include a processor 210, a microphone 220 and a digital audio source 260. The processor 210 and the microphone 220 may be implementations of the processor 110 and the microphone 120 of FIG. 1.

As shown, the microphone 220 is not coupled or connected to the processor 210. Instead, an output from the digital audio source 260 may be spliced or otherwise coupled to the processor 210. In other implementations, signals from the digital audio source 260 and the microphone 220 may be multiplexed together (not shown for simplicity) and coupled to the processor 210. The digital audio source 260 may be a digital device capable of producing an output signal that is a perfect or near perfect match for the output from the microphone 220 (replaced by the digital audio source 260). Thus, the processor 210 may erroneously authenticate the output from the digital audio source 260.

Figure 3:
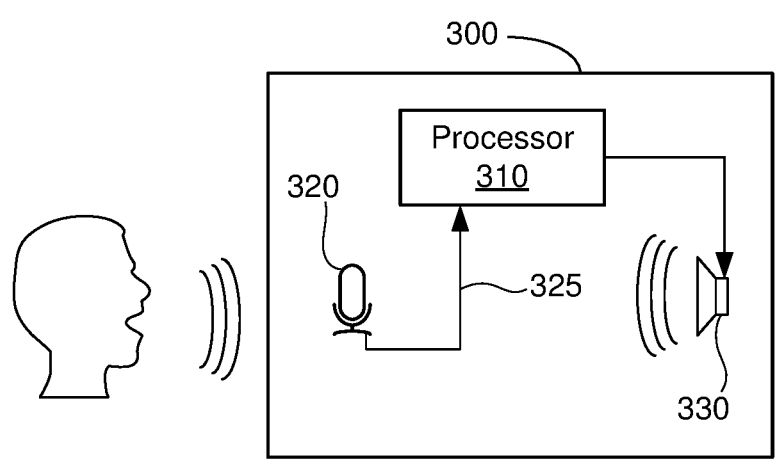
FIG. 3 is a block diagram of an example processing system, in accordance with some implementations.

FIG. 3 is a block diagram of an example processing system 300, in accordance with some implementations. The processing system 300 may include a processor 310, a microphone 320, and a speaker 330. The processing system 300 may enable validation of an audio signal 325 from the microphone 320. In some implementations, processing system 300 may also perform the voice recognition functions of the processing system 101 of FIG. 1. Thus, the processing system 300 may partially or completely replace the processing system 101. The processor 310, the microphone 320, and the speaker 330 may be shared with other devices or components within a system or device, such as the computing device 100.

The processing system 300 may validate the audio signal 325 and thereby indicate that the processing system 300 has not been compromised. A "valid" audio signal may refer to an audio signal that has been captured by the microphone 320 rather than being produced by a playback unit, such as the digital audio source 260 of FIG. 2. Thus, a valid audio signal may be trusted and used for other procedures, such as the voice recognition procedure as described with respect to FIG. 1.

In some implementations, the processor 310 may cause the speaker 330 to produce one or more subaudible tones while simultaneously capturing audio through the microphone 320. Thus, the microphone 320 should receive a user's voice and the subaudible tones at the same time. If the processor 310 detects the subaudible tones in the audio signal 325, then the audio signal 325 is valid. On the other hand, if the processor 310 does not detect the subaudible tones, then the audio signal 325 is not valid.

If the processing system 300 is also performing voice recognition operations as described with respect to FIG. 1, then the processing system 300 can indicate that the audio signal 325 provided for voice recognition is a valid audio signal, and is not provided by a digital audio source. In some implementations, the processor 310 may filter out the subaudible tones prior to using the audio signal 325 for voice recognition.

Subaudible tones may refer to any tones that may be at a frequency or amplitude (e.g., sound level) that may not be easily or normally detected by human hearing. In some implementations, the subaudible tones may be infrasonic tones in a low frequency range, such as tones less than 25 Hz. In some other implementations, the subaudible tones may be ultrasonic tones in a high frequency range, such tones greater than 20 KHz. Subaudible tones may also be any tone or tones that are at low sound levels where human hearing is less sensitive. In some implementations, subaudible tone levels may be at a sound level between 10-25 dB. In some aspects, the microphone 320 and the speaker 330 may be selected for the processing system 300 such that they can detect and generate the subaudible tones as described herein.

The subaudible tones used to validate the audio signal 325 may include a single tone or may include a sequence of two or more tones. Thus, the processor 310 may validate the audio signal 325 by detecting the presence of the same single or sequence of subaudible tones in the audio signal 325 that were generated by the speaker 330. In one example, the speaker 330 may generate a repeating sequence of four different subaudible tones. Thus, for the audio signal 325 to be valid, the same repeating sequence of four subaudible tones should be detected by the processor 310. Although a sequence of four different subaudible tones is described, in other implementations, a sequence of subaudible tones may have any feasible number of subaudible tones. In some implementations, the sequence of subaudible tones may be pre-determined.

In some implementations, the processor 310 may use time-hopping techniques to generate the subaudible tones. Time-hopping techniques may vary the time of generation and/or duration of any subaudible tone, or sequence of tones, generated by the speaker 330. Varying the times that the subaudible tones are generated increases the difficulty associated with trying to spoof the audio signal 325. For example, a duration of each tone in the sequence of tones may be the same for each tone, or may be different. In some implementations, the duration of the tones may vary based on a predetermined sequence of duration times, or may vary based on a random or quasi-random number generator.

In some implementations, the subaudible tones may be generated using one or more spread spectrum techniques. Spread spectrum techniques refer generally to "spreading" a signal of a particular bandwidth over a range of frequencies resulting in a signal with a wider bandwidth. Subaudible tones that are generated with spread spectrum techniques may be harder to detect and, therefore, harder to mimic or spoof, especially compared to plain (non-spread spectrum generated) subaudible tones.

One example of a spread spectrum technique is direct-sequence spread spectrum (DSSS) modulation. DSSS modulation techniques are used in cell phone communications such as code division multiple access (CDMA), as well as in some Wi-Fi communication protocols. In some implementations, a DSSS technique modulates a subaudible tone or tones with a pseudo noise (PN) code. The resulting subaudible tones becomes scrambled by the PN code. In order to decode the DSSS processed subaudible tone or tones, the processor 310 correlates the audio signal 325 using the PN code. If after the correlations, the processor 310 detects the presence of the subaudible tone or tones, then the audio signal 325 is validated. Thus, the DSSS modulation techniques may create a subaudible tone or tones that is/are difficult to mimic.

Figure 4:
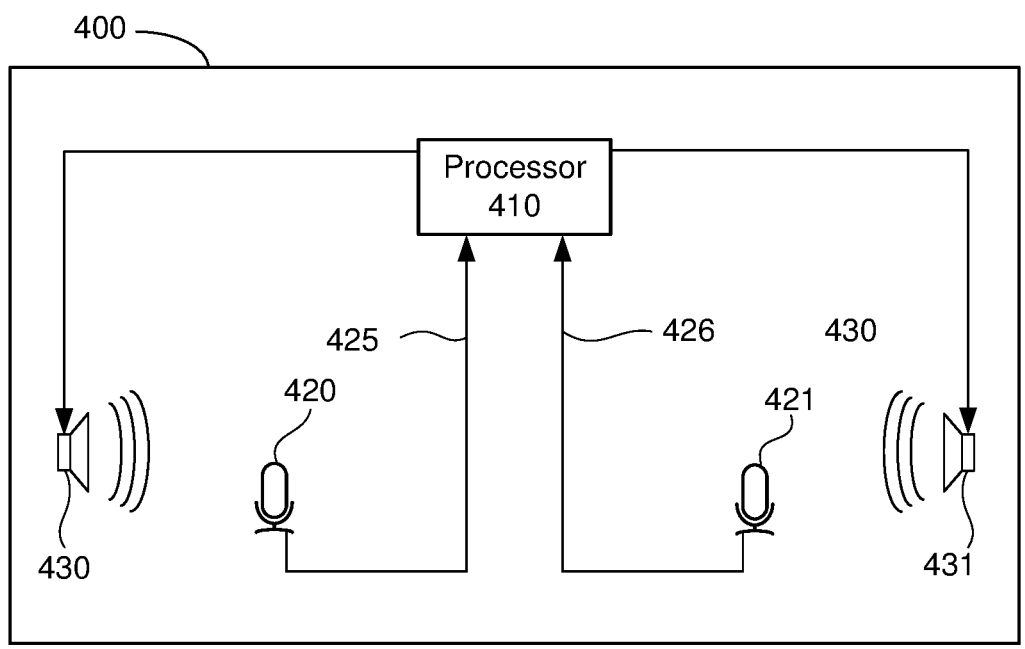
FIG. 4 is a block diagram of another example processing system, in accordance with some implementations.
Figure 4:
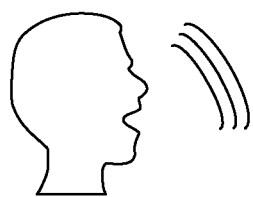

FIG. 4 is a block diagram of another example processing system 400, in accordance with some implementations. The processing system 400 may include a processor 410, a first microphone 420, a second microphone 421, a first speaker 430, and a second speaker 431. Although shown as associated with the processing system 400, the first microphone 420, the second microphone 421, the first speaker 430, and the second speaker 431 may be shared with other devices or components within a system or device, such as the computing device 100 of FIG. 1. Although shown with two microphones 420-421 and two speakers 430-431, the processing system 400 may include any number of microphones and/or speakers. The first microphone 420 and the second microphone 421 may be implementations of the microphone 320 of FIG. 3. Similarly, the first speaker 430 and the second speaker 431 may be implementations of the speaker 330, and the processor 410 may be an implementation of the processor 310.

The processing system 400 may use one or more far field processing techniques to validate a first audio signal 425 and/or a second audio signal 426 from the first microphone 420 and the second microphone 421, respectively. In some aspects, far field processing techniques may use physical locations of the microphones 420-421 with respect to the speakers 430-431 to validate the audio signals 440 and 441.

For example, the processor 410 can cause the first speaker 430 and the second speaker 431 to generate subaudible tones. If the first microphone 420 is closer to the first speaker 430 than to the second speaker 431, then the first audio signal 425 should include the subaudible tones from the first speaker 430 at a larger amplitude (volume) than the subaudible tones from the second speaker 431. Further, if the second microphone 421 is closer to the second speaker 431 than to the first speaker 430, then the second audio signal 426 should include the subaudible tones from the second speaker 431 at a larger amplitude than the subaudible tones from the first speaker 430. Thus, the processor 410 may validate the first audio signal 425 and the second audio signal 426 based on amplitudes of the subaudible tones contained therein.

In some implementations, the processor 410 may cause the first speaker 430 to generate a first tone or sequence of subaudible tones and the second speaker 431 to generate a second tone or sequence of subaudible tones. Thus, the first audio signal 425 may include the first tone or sequence of tones from the first speaker 430 at a first amplitude and the second tone or sequence of tones from the second speaker 431 at a second amplitude, where the first amplitude is greater than the second amplitude. Similarly, the second audio signal 441 may include the second tone or sequence of subaudible tones from the second speaker 431 at a third amplitude and the first tone or sequence of subaudible tones from the first speaker 430 at a fourth amplitude, where the third amplitude is greater than the fourth amplitude. In some aspects, the amplitudes of the subaudible tones may be based on the distance between the microphones 420-421 and the speakers 430-431, respectively. In some implementations, the first sequence of subaudible tones and the second sequence of subaudible tones may be different from each other. For example, subaudible tones included in the first sequence may be absent from the second sequence and vice-versa. Moreover, the first sequence of subaudible tones and the second sequence of subaudible tones may be generated by the speakers contemporaneously.

The far field processing techniques discussed with respect to the processing system 400, may be used separately or together with the DSSS techniques and the time-hopping techniques discussed with respect to the processing system 300 of FIG. 3. Far field processing techniques increase the difficulty associated with replacing or spoofing an audio signal. When far field processing techniques are used together with the DSSS and/or time-hopping techniques, replacing, or spoofing an audio signal is made even more difficult.

Figure 5:
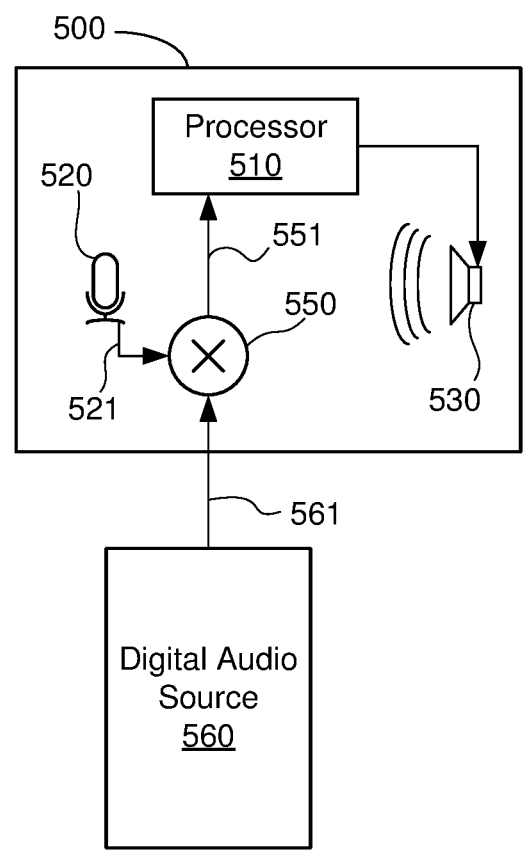
FIG. 5 is a block diagram of a yet another example processing system in accordance with some implementations

FIG. 5 is a block diagram of a yet another example processing system 500 in accordance with some implementations. The processing system 500 may include a processor 510, a microphone 520 a speaker 530, a mixer 550 and a digital audio source 560. The processor 510, microphone 520, and speaker 530 may be implementations of the processor 310, microphone 320, and speaker 330 of FIG. 3, respectively. The digital audio source 560 may be an implementation of the digital audio source 260 of FIG. 2.

The mixer 550 may mix or combine an audio signal 521 from the microphone 520 with a signal 561 from the digital audio source 560. In this manner, a pre-recorded audio signal from the digital audio source 560 may be mixed with the audio signal 521 to attempt to circumvent validation provided by subaudible tones from the speaker 530.

However, a variety of approaches may be used to detect the presence of the mixer 550. In one example approach, the processor 510 may use one or more conventional wire-tap detection techniques to send or transmit signals to the mixer 550. These signals may be reflected by the mixer 550 and detected by the processor 510. This transmit-and-detect approach, sometimes referred to as "pinging," also may detect if the wires to the microphone 520 have been cut as well as determine the presence and/or location of the mixer 550. In another example approach, the processor 510 may perform signal analysis on audio signal 551 to determine whether the audio signal 551 has been processed by the mixer 550 or if the audio signal 551 is coming direct from the microphone 520.

In some implementations, the processor 510 may use neural networks and/or machine learning to detect the mixer 550. In a first example, the processor 510 may "train" itself to recognize typical audio signals from the microphone 520. For example, the processor 510 may "learn" expected frequency responses and/or sound levels associated with the microphone 520. If, during operation, the processor 510 detects a change in the frequency response or a change in the sound level (e.g., a change from the learned frequency response or sound level), then the processor 510 may determine that a mixer 550 has been inserted between the microphone 520 and the processor 510. The processor 510 may, therefore, not validate the audio signal 551. In some implementations, if processing system 500 is also performing voice recognition functions, the non-validated audio signal 551 may be rejected by the processing system 500. In some implementations, the processor 510 may learn expected frequency responses and/or sound levels by simulation associated with the microphone 520, during design and/or manufacturing testing, or during regular operation of the processing system 500.

Figure 6:
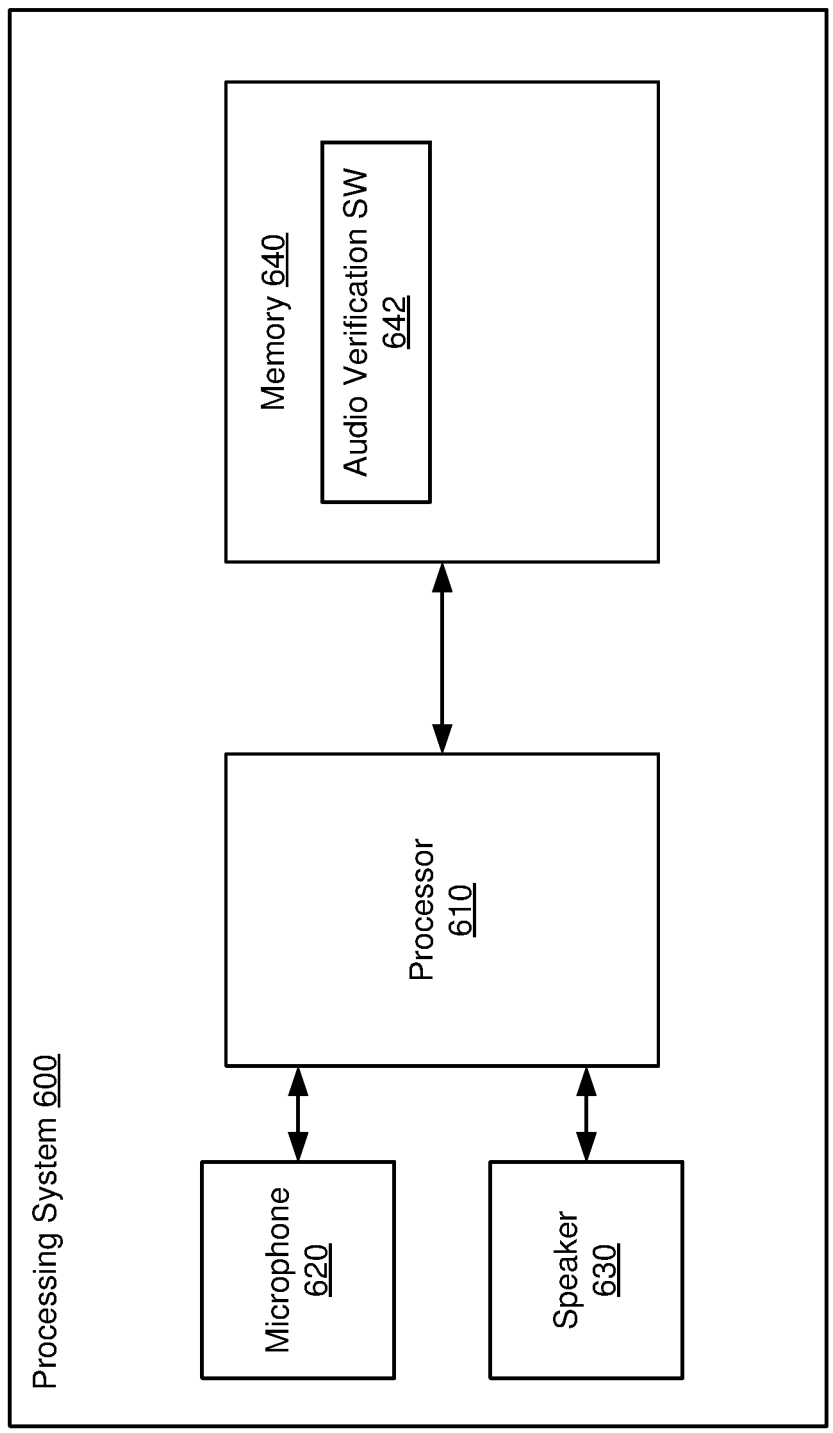
FIG. 6 is a block diagram of an example processing system.

FIG. 6 is a block diagram of an example processing system 600. The processing system 600 may include a processor 610, a microphone 620, a speaker 630, and a memory 640. The processor 610 may be an implementation of the processor 310 of FIG. 3, or the processor 410 of FIG. 4. The microphone 620 may be an implementation of the microphone 320 of FIG. 3, or the microphones 420 and 421 or FIG. 4. The speaker 630 may be an implementation of the speaker 330 of FIG. 3 or the speakers 430 and 431 of FIG. 4.

The memory 640 may include a non-transitory computer-readable storage medium (such as one or more nonvolatile memory elements, such as EPROM, EEPROM, Flash memory, a hard drive, and so on) that may store an audio validation software module 642 to validate an audio signal from the microphone 620.

The processor 610, which may be coupled to the microphone 620 and the speaker 630, may be any one or more suitable controllers, processors, state machines or the like capable of executing scripts or instructions of one or more software programs stored in the processing system 600 (e.g., within the memory 640). In some embodiments, the processor 610 may be implemented with a hardware controller, a processor, a state machine, or other circuits to provide the functionality of the processor 610 executing instructions stored in the memory 640. The microphone 620 may be positioned proximate to the speaker 630 enabling the microphone 620 to detect sounds generated by the speaker 630.

The processor 610 may execute the audio validation software module 642 to validate audio signals from the microphone 620. In some implementations, the processor 610 may execute the audio validation software module 642 to cause the speaker 630 to output one or more subaudible tones and simultaneously receive an audio signal from the microphone 620 that includes a user's voice and the subaudible tones produced by the speaker 630. The processor 610 may validate the audio signal by determining that a signal from the microphone 620 includes the one or more subaudible tones produced by the speaker 630. In some implementations, the processor 610 may perform one or more spread spectrum techniques and/or time-hopping techniques to generate and detect the subaudible tones.

Figure 7:
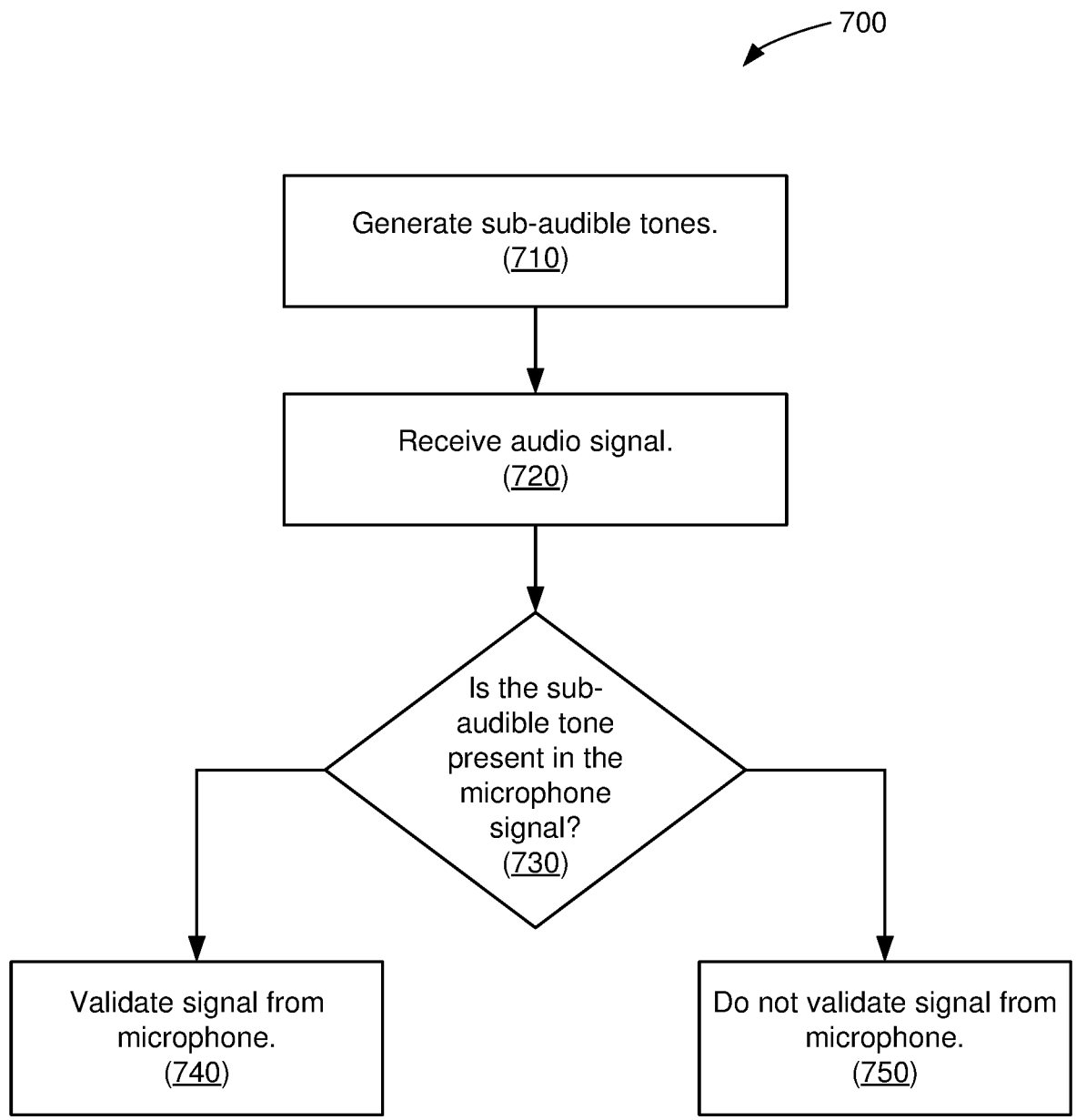
FIG. 7 is an illustrative flow chart depicting an example operation for validating audio signals, in accordance with some implementations.

FIG. 7 is an illustrative flow chart depicting an example operation 700 for validating audio signals, in accordance with some implementations. By way of example, the operation 700 may be performed by the processor 310 of FIG. 3. In other implementations, the operation 700 may be performed by the processor 410 of FIG. 4, the processor 610 of FIG. 6, any feasible processor (including a general-purpose processor), a state machine, or any other technically feasible device, circuit, or module. In some embodiments, the operation 700 may include fewer or more operational steps than those depicted in the example of FIG. 7. Further, two or more of the operational steps may be performed in a different order and/or in parallel.

The operation begins as the processor 310 causes one or more subaudible tones to be generated by one or more speakers (710). As described with respect to FIG. 3, a subaudible tone may be any tone having a frequency or an amplitude that may not be easily or normally detected by human hearing. In some implementations, the subaudible tones may be infrasonic tones in a low frequency range (e.g., between 25-250 Hz), ultrasonic tones in a high frequency range (e.g., between 14-20 KHz), such as between 14-20 KHz, or at a sound level between 10-25 db. The subaudible tones may be generated by two or more speakers and each speaker may generate different subaudible tone or tones. In some other implementations, the processor 310 may cause each speaker to generate a sequence of one or more subaudible tones. In some other implementations, the processor 310 may use DSSS and/or time-hopping techniques to generate the one or more subaudible tones.

Next, the processor 310 receives an audio signal (720). In some implementations, the processor 310 may receive one or more audio signals from one or more microphones. Next, the processor 310 determines if the subaudible tones that were generated by the one or more speakers are present in the audio signal (730). In some implementations, the processor 310 may analyze the audio signals to determine if the same subaudible tone or tones that were generated by the speakers are included in the audio signal. In some implementations, the processor 310 may use DSSS and/or time-hopping techniques to detect and determine which, if any, subaudible tones are present in the received audio signal.

If the processor 310 determines that the same or substantially similar subaudible tones are present in the received audio signal that were generated by the speakers, then the processor 310 may validate the audio signal (740). In some implementations, a validated audio signal may be used for voice recognition.

On the other hand, if the processor 310 determines that the received audio signal lacks the same subaudible tones that were generated by the speakers, then the processor 310 may not validate the audio signal (750). A non-validated audio signal should not be used for voice recognition since the source of the audio signal is possibly from a digital audio source.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method, comprising:
outputting, by a first speaker, a first sequence of subaudible tones;
outputting, by a second speaker, a second sequence of subaudible tones, wherein the first sequence of subaudible tones is different from the second sequence of subaudible tones;
receiving, from a microphone coupled to the first speaker via a processor, an audio signal while concurrently outputting the first sequence of subaudible tones and the second sequence of subaudible tones;
selectively validating the audio signal based at least in part on whether the audio signal includes the first sequence of subaudible tones and the second sequence of subaudible tones; and
authenticating a user based at least in part on the validated audio signal.

2. The method of claim 1, wherein the selectively validating comprises:
determining that the first sequence of subaudible tones exceeds a first amplitude and the second sequence of subaudible tones exceeds a second amplitude.

3. The method of claim 2, wherein the first amplitude is greater than the second amplitude.

4. The method of claim 1, wherein the first sequence of subaudible tones and the second sequence of subaudible tones include ultrasonic tones, infrasonic tones, or a combination thereof.

5. The method of claim 1, wherein each subaudible tone within each sequence of subaudible tones has a duration based on a pre-determined sequence of duration times.

6. The method of claim 1, wherein the first sequence of subaudible tones and the second sequence of subaudible tones are generated using direct-sequence spread spectrum modulation.

7. The method of claim 1, wherein the selectively validating comprises:
determining a frequency response associated with the microphone;
determining whether the audio signal is consistent with the frequency response associated with the microphone; and
validating the audio signal in response to determining that the audio signal is consistent with the frequency response associated with the microphone.

8. A processing system comprising:
two or more speakers;
one or more processors;
at least one microphone coupled to one of the two or more speakers via one of the one or more processors; and
a memory storing instructions that, when executed by the one or more processors cause the processing system to:
output, by a first speaker, a first sequence of subaudible tones;
output, by a second speaker, a second sequence of subaudible tones, wherein the first sequence of subaudible tones is different from the second sequence of subaudible tones;
receive an audio signal from the microphone while concurrently outputting the first sequence of subaudible tones and the second sequence of subaudible tones;
selectively validate the audio signal based at least in part on whether the audio signal includes the first sequence of subaudible tones and the second sequence of subaudible tones; and
authenticate a user based at least in part on the validated audio signal.

9. The processing system of claim 8, wherein execution of the instructions to selectively validate the audio signal causes the processing system to determine that the first sequence of subaudible tones exceeds a first amplitude and the second sequence of subaudible tones exceeds a second amplitude.

10. The processing system of claim 9, wherein the first amplitude is greater than the second amplitude.

11. The processing system of claim 8, wherein the first sequence of subaudible tones and the second sequence of subaudible tones include ultrasonic tones, infrasonic tones, or a combination thereof.

12. The processing system of claim 8, wherein each tone within each sequence of subaudible tones has a duration based on a pre-determined sequence of duration times.

13. The processing system of claim 8, wherein the first sequence of subaudible tones and the second sequence of subaudible tones are generated using direct-sequence spread spectrum modulation.

14. The processing system of claim 8, wherein execution of the instructions to selectively validate the audio signal causes the processing system to:
determine a frequency response associated with the microphone;
determine whether the audio signal is consistent with the frequency response associated with the microphone; and
validate the audio signal in response to a determination that the audio signal is consistent with the frequency response associated with the microphone.

15. A method, comprising:
outputting, by a first speaker, a first sequence of subaudible tones;
outputting, by a second speaker, a second sequence of subaudible tones, wherein the first sequence of subaudible tones is different from the second sequence of subaudible tones;
receiving, from a microphone coupled to the first speaker via a processor, an audio signal while concurrently outputting the first sequence of subaudible tones and the second sequence of subaudible tones;
selectively validating the audio signal based at least in part on whether the audio signal includes the first sequence of subaudible tones and the second sequence of subaudible tones; and
matching a voice in the validated audio signal to a previously captured reference voice pattern.

16. The method of claim 15, wherein the selectively validating comprises:
validating the audio signal in response to determining that the audio signal includes the first sequence of subaudible tones and the second sequence of subaudible tones.

* * * * *